(12) United States Patent
Holmes et al.

(10) Patent No.: US 11,407,191 B2
(45) Date of Patent: Aug. 9, 2022

(54) METHOD FOR THE MANUFACTURE OF A SHOE SOLE, SHOE SOLE, AND SHOE WITH PRE-MANUFACTURED TPU ARTICLE

(71) Applicant: adidas AG, Herzogenaurach (DE)

(72) Inventors: Christopher Edward Holmes, Herzogenaurach (DE); Sabrina Kerling, Herzogenaurach (DE); Tru Huu Minh Le, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 557 days.

(21) Appl. No.: 15/602,474

(22) Filed: May 23, 2017

(65) Prior Publication Data

US 2017/0341326 A1 Nov. 30, 2017

(30) Foreign Application Priority Data

May 24, 2016 (DE) .......................... 102016209046.1

(51) Int. Cl.
*B29D 35/14* (2010.01)
*A43B 13/12* (2006.01)
(Continued)

(52) U.S. Cl.
CPC ............ *B29D 35/142* (2013.01); *A43B 13/04* (2013.01); *A43B 13/12* (2013.01); *B29B 11/08* (2013.01);
(Continued)

(58) Field of Classification Search
CPC .... B29D 35/142; B29D 35/122; A43B 13/12; B29K 2105/048
See application file for complete search history.

(56) References Cited

U.S. PATENT DOCUMENTS

| 1,855,098 A | 4/1932 | Russell |
| 2,787,809 A | 4/1957 | Stastny |

(Continued)

FOREIGN PATENT DOCUMENTS

| AT | 505333 | 12/2008 |
| CN | 1087573 | 6/1994 |

(Continued)

OTHER PUBLICATIONS

"Plastic", Available online at: https://www.britannica.com/print/article/463684, Aug. 17, 2016, 15 pages.
(Continued)

*Primary Examiner* — Christopher T Schatz
(74) *Attorney, Agent, or Firm* — Kilpatrick Townsend & Stockton LLP (57) ABSTRACT

Described are a method for the manufacture of a shoe sole, the sole manufactured by the method, and a shoe including the sole. The method includes loading a pre-manufactured article comprising thermoplastic polyurethane (TPU) material into a mold; loading pellets of an expanded thermoplastic polyurethane (eTPU) material into said mold; and connecting the pellets with each other and to the pre-manufactured TPU article by providing an interconnecting medium, wherein the material of the pre-manufactured TPU article either comprises an additive to increase the viscosity of the material of the pre-manufactured TPU article, or has been annealed.

16 Claims, 2 Drawing Sheets

(51) Int. Cl.
- *B29D 35/12* (2010.01)
- *A43B 13/04* (2006.01)
- *B29B 11/08* (2006.01)
- *B29K 75/00* (2006.01)
- *B29K 105/04* (2006.01)

(52) U.S. Cl.
CPC ........ *B29D 35/122* (2013.01); *B29K 2075/00* (2013.01); *B29K 2105/048* (2013.01)

(56) References Cited

U.S. PATENT DOCUMENTS

| | | |
|---|---|---|
| 3,058,162 A | 10/1962 | Grabowski |
| 3,315,317 A | 4/1967 | Winkler |
| 3,424,827 A | 1/1969 | Galizia et al. |
| 3,598,672 A | 8/1971 | Heller |
| 3,813,201 A | 5/1974 | Frederick et al. |
| 4,483,809 A | 11/1984 | Ando et al. |
| 4,902,721 A | 2/1990 | Pham et al. |
| 4,936,030 A | 6/1990 | Rennex |
| D340,797 S | 11/1993 | Pallera et al. |
| 5,314,927 A | 5/1994 | Kondo et al. |
| 5,343,190 A | 8/1994 | Rodgers |
| 5,518,060 A | 5/1996 | Bilderback et al. |
| 5,667,737 A | 9/1997 | Wittmann |
| D384,794 S | 10/1997 | Merceron |
| 5,718,968 A | 2/1998 | Cutler et al. |
| 5,736,167 A | 4/1998 | Chang |
| 5,937,265 A | 8/1999 | Pratt et al. |
| 6,035,554 A | 3/2000 | Duncan |
| 6,042,764 A | 3/2000 | Eder et al. |
| 6,432,320 B1 | 8/2002 | Bonsignore et al. |
| 6,464,922 B1 | 10/2002 | Bogdan |
| 6,800,227 B1 | 10/2004 | Nohara et al. |
| D549,432 S | 8/2007 | McClaskie |
| D556,989 S | 12/2007 | Horne et al. |
| D593,292 S | 6/2009 | McClaskie |
| D709,680 S | 7/2014 | Herath |
| 8,958,901 B2 | 2/2015 | Regan |
| D728,910 S | 5/2015 | Hansen |
| D740,003 S | 10/2015 | Herath |
| D740,004 S | 10/2015 | Hoellmueller et al. |
| 9,212,270 B2 | 12/2015 | Fußl et al. |
| D758,056 S | 6/2016 | Herath et al. |
| D765,362 S | 9/2016 | Kuerbis |
| D768,362 S | 10/2016 | Budke |
| D776,410 S | 1/2017 | Herath et al. |
| D782,169 S | 3/2017 | Roulo et al. |
| D783,264 S | 4/2017 | Hoellmueller et al. |
| 9,610,746 B2 | 4/2017 | Wardlaw et al. |
| D788,420 S | 6/2017 | Roulo et al. |
| 9,681,709 B2 | 6/2017 | Lott et al. |
| 9,781,970 B2 | 10/2017 | Wardlaw et al. |
| 9,781,974 B2 | 10/2017 | Reinhardt |
| 9,788,598 B2 | 10/2017 | Reinhardt et al. |
| 9,788,606 B2 | 10/2017 | Reinhardt et al. |
| 9,820,528 B2 | 11/2017 | Reinhardt et al. |
| 9,849,645 B2 | 12/2017 | Wardlaw et al. |
| D807,622 S | 1/2018 | Bikowsky et al. |
| D809,259 S | 2/2018 | Remy |
| D811,062 S | 2/2018 | Teague |
| D814,758 S | 4/2018 | Truelsen |
| 9,930,928 B2 | 4/2018 | Whiteman et al. |
| 9,968,157 B2 | 5/2018 | Wardlaw et al. |
| 10,039,342 B2 | 8/2018 | Reinhardt et al. |
| D828,686 S | 9/2018 | Hoellmueller et al. |
| D828,991 S | 9/2018 | Herath |
| D840,136 S | 2/2019 | Herath et al. |
| D840,137 S | 2/2019 | Herath et al. |
| D846,256 S | 4/2019 | Khalife |
| 10,259,183 B2 | 4/2019 | Wardlaw et al. |
| D850,766 S | 6/2019 | Girard et al. |
| D852,475 S | 7/2019 | Hoellmueller |
| D852,476 S | 7/2019 | Hartmann |
| D855,297 S | 8/2019 | Motoki |
| D855,953 S | 8/2019 | Girard et al. |
| D858,051 S | 9/2019 | Mace |
| D858,960 S | 9/2019 | Mace |
| D858,961 S | 9/2019 | Mace |
| D869,833 S | 12/2019 | Hartmann et al. |
| 10,506,846 B2 | 12/2019 | Wardlaw et al. |
| 2001/0013459 A1 | 8/2001 | Pattantyus-Abraham et al. |
| 2001/0048182 A1 | 12/2001 | Caretta et al. |
| 2002/0170650 A1 | 11/2002 | Chi et al. |
| 2003/0033730 A1 | 2/2003 | Burke et al. |
| 2003/0232933 A1* | 12/2003 | Lagneaux .......... C08G 18/6212 525/452 |
| 2004/0032042 A1 | 2/2004 | Chi |
| 2005/0110183 A1 | 5/2005 | Buchel et al. |
| 2005/0116372 A1 | 6/2005 | Bruning et al. |
| 2005/0144034 A1 | 6/2005 | Hunter |
| 2005/0183292 A1 | 8/2005 | DiBenedetto et al. |
| 2006/0043645 A1 | 3/2006 | Goettsch et al. |
| 2007/0029698 A1 | 2/2007 | Rynerson et al. |
| 2008/0224357 A1 | 9/2008 | Allmendinger et al. |
| 2008/0277837 A1 | 11/2008 | Liu et al. |
| 2008/0282579 A1* | 11/2008 | Bobbett .............. A43B 13/026 36/127 |
| 2009/0013558 A1 | 1/2009 | Hazenberg et al. |
| 2009/0072436 A1 | 3/2009 | Dean |
| 2009/0142563 A1 | 6/2009 | Zorn et al. |
| 2010/0267850 A1 | 10/2010 | Yoshida et al. |
| 2011/0232008 A1 | 9/2011 | Crisp |
| 2011/0266717 A1 | 11/2011 | Nehls et al. |
| 2012/0056345 A1 | 3/2012 | Lee et al. |
| 2012/0073161 A1 | 3/2012 | Doyle |
| 2012/0186107 A1 | 7/2012 | Crary et al. |
| 2013/0125319 A1 | 5/2013 | Regan |
| 2013/0126075 A1 | 5/2013 | Jiang et al. |
| 2013/0150468 A1 | 6/2013 | Füssi et al. |
| 2013/0203879 A1 | 8/2013 | Rensen et al. |
| 2013/0266792 A1 | 10/2013 | Nohara et al. |
| 2013/0291409 A1 | 11/2013 | Reinhardt et al. |
| 2013/0333950 A1 | 12/2013 | Atkins et al. |
| 2014/0017450 A1 | 1/2014 | Baghdadi et al. |
| 2014/0110491 A1 | 4/2014 | Roberts, Jr. |
| 2014/0189964 A1 | 7/2014 | Wen et al. |
| 2014/0223673 A1 | 8/2014 | Wardlaw et al. |
| 2014/0223776 A1 | 8/2014 | Wardlaw et al. |
| 2014/0223777 A1 | 8/2014 | Whiteman et al. |
| 2014/0223783 A1 | 8/2014 | Wardlaw et al. |
| 2014/0227505 A1 | 8/2014 | Schiller et al. |
| 2014/0243442 A1 | 8/2014 | Coles et al. |
| 2014/0259753 A1 | 9/2014 | Watkins et al. |
| 2014/0275306 A1 | 9/2014 | Watkins et al. |
| 2014/0366403 A1 | 12/2014 | Reinhardt et al. |
| 2014/0366404 A1 | 12/2014 | Reinhardt et al. |
| 2014/0366405 A1 | 12/2014 | Reinhardt et al. |
| 2015/0076236 A1 | 3/2015 | Chen |
| 2015/0101133 A1 | 4/2015 | Manz et al. |
| 2015/0101134 A1 | 4/2015 | Manz et al. |
| 2015/0119482 A1 | 4/2015 | Kumar et al. |
| 2015/0166270 A1 | 6/2015 | Buscher et al. |
| 2015/0174808 A1 | 6/2015 | Rudolph et al. |
| 2015/0197617 A1 | 7/2015 | Prissok et al. |
| 2015/0237823 A1 | 8/2015 | Schmitt et al. |
| 2015/0344661 A1 | 12/2015 | Spies et al. |
| 2015/0366289 A1 | 12/2015 | Rustam et al. |
| 2016/0001476 A1 | 1/2016 | Sommer et al. |
| 2016/0015120 A1* | 1/2016 | Denison .............. A43B 3/0094 36/127 |
| 2016/0037859 A1 | 2/2016 | Smith et al. |
| 2016/0044992 A1 | 2/2016 | Reinhardt et al. |
| 2016/0046751 A1 | 2/2016 | Spies et al. |
| 2016/0121524 A1 | 5/2016 | Däschlein et al. |
| 2016/0128426 A1 | 5/2016 | Reinhardt et al. |
| 2016/0227876 A1 | 8/2016 | Le et al. |
| 2016/0244583 A1 | 8/2016 | Keppeler |
| 2016/0244584 A1 | 8/2016 | Keppeler |
| 2016/0244587 A1 | 8/2016 | Gutmann et al. |
| 2016/0278481 A1 | 9/2016 | Le et al. |
| 2016/0295955 A1 | 10/2016 | Wardlaw et al. |
| 2016/0302508 A1 | 10/2016 | Kormann et al. |
| 2016/0311993 A1 | 10/2016 | Zhang et al. |

(56) References Cited

U.S. PATENT DOCUMENTS

| | | |
|---|---|---|
| 2016/0346627 A1 | 12/2016 | Le et al. |
| 2017/0015825 A1* | 1/2017 | Ting .................... B29D 35/122 |
| 2017/0055639 A1 | 3/2017 | Smith |
| 2017/0173910 A1 | 6/2017 | Wardlaw et al. |
| 2017/0253710 A1 | 9/2017 | Smith et al. |
| 2017/0259474 A1 | 9/2017 | Holmes et al. |
| 2017/0340067 A1 | 11/2017 | Dyckmans et al. |
| 2017/0341325 A1 | 11/2017 | Le et al. |
| 2017/0341327 A1 | 11/2017 | Le et al. |
| 2018/0035755 A1 | 2/2018 | Reinhardt et al. |
| 2018/0093437 A1 | 4/2018 | Wardlaw et al. |
| 2018/0103719 A1 | 4/2018 | Chen |
| 2018/0125155 A1 | 5/2018 | Kirupanantham et al. |
| 2018/0153254 A1 | 6/2018 | Fusco et al. |
| 2018/0154598 A1 | 6/2018 | Kurtz et al. |
| 2018/0206591 A1 | 7/2018 | Whiteman et al. |
| 2018/0000197 A1 | 8/2018 | Wardlaw et al. |
| 2018/0235310 A1 | 8/2018 | Wardlaw et al. |
| 2018/0289098 A1 | 10/2018 | Downing et al. |
| 2018/0290349 A1 | 10/2018 | Kirupanantham et al. |
| 2018/0303198 A1 | 10/2018 | Reinhardt et al. |
| 2018/0317591 A1 | 11/2018 | Hollinger et al. |
| 2018/0332925 A1 | 11/2018 | Bailey et al. |
| 2018/0352900 A1 | 12/2018 | Hartmann et al. |
| 2019/0082789 A1 | 3/2019 | Smith et al. |
| 2019/0231021 A1 | 8/2019 | Hoying et al. |
| 2019/0283394 A1 | 9/2019 | Ashcroft et al. |
| 2019/0291371 A1 | 9/2019 | Wardlaw et al. |
| 2019/0335851 A1 | 11/2019 | Hartmann et al. |

FOREIGN PATENT DOCUMENTS

| | | |
|---|---|---|
| CN | 2501679 Y | 7/2002 |
| CN | 101060963 A | 10/2007 |
| CN | 202895563 U | 4/2013 |
| CN | 103978620 | 8/2014 |
| CN | 105209233 A | 12/2015 |
| CN | 205021904 U | 2/2016 |
| CN | 105520278 A | 4/2016 |
| DE | 1729011 A1 | 6/1971 |
| DE | 3032246 | 4/1982 |
| DE | 3437786 | 4/1986 |
| DE | 19633467 | 2/1998 |
| DE | 19648804 | 5/1998 |
| DE | 19654860 | 5/1998 |
| DE | 19704700 | 9/1998 |
| DE | 19860611 | 3/2000 |
| DE | 102004049060 | 6/2005 |
| DE | 102004028462 | 12/2005 |
| DE | 202006009569 U1 | 8/2006 |
| DE | 202007006164 | 9/2007 |
| DE | 102006024940 | 12/2007 |
| DE | 102007054723 | 5/2009 |
| DE | 102009030678 | 4/2010 |
| DE | 102009004386 | 7/2010 |
| DE | 202011109598 U1 | 2/2012 |
| DE | 102011108744 | 1/2013 |
| DE | 102013012515 | 3/2014 |
| DE | 102013002519 | 8/2014 |
| DE | 102013108053 | 1/2015 |
| DE | 102013221018 | 4/2015 |
| DE | 102013221020 | 4/2015 |
| DE | 102014107847 | 12/2015 |
| DE | 102014216992 A1 | 3/2016 |
| DE | 102015202013 | 8/2016 |
| DE | 102015202014 | 8/2016 |
| DE | 102015224885 | 6/2017 |
| EP | 0790010 A1 | 8/1997 |
| EP | 0792593 A2 | 9/1997 |
| EP | 0976518 A2 | 2/2000 |
| EP | 1016354 | 7/2000 |
| EP | 1259365 A | 11/2002 |
| EP | 1535714 | 6/2005 |
| EP | 1990170 | 11/2008 |
| EP | 2564719 | 3/2013 |
| EP | 2649896 | 10/2013 |
| EP | 2684665 | 1/2014 |
| EP | 2764972 | 8/2014 |
| EP | 2767181 | 8/2014 |
| EP | 2786670 | 10/2014 |
| EP | 2845504 | 3/2015 |
| EP | 2862467 | 4/2015 |
| EP | 2865289 | 4/2015 |
| EP | 2984956 | 2/2016 |
| EP | 2649896 A2 | 10/2016 |
| EP | 3114954 A1 | 1/2017 |
| EP | 2767183 | 4/2017 |
| EP | 3488723 A1 | 5/2019 |
| GB | 1063353 | 3/1967 |
| GB | 1275095 | 5/1972 |
| GB | 1439101 | 6/1976 |
| JP | S48-045560 | 6/1973 |
| JP | S48-042216 | 12/1973 |
| JP | S49-020266 | 5/1974 |
| JP | S50-155569 | 12/1975 |
| JP | 54114354 | 9/1979 |
| JP | 55129004 | 10/1980 |
| JP | 5620402 | 2/1981 |
| JP | S57-005009 U | 1/1982 |
| JP | 57180653 | 11/1982 |
| JP | 5821304 | 2/1983 |
| JP | S58-142828 A | 8/1983 |
| JP | S60-500491 A | 4/1985 |
| JP | S61-041402 A | 2/1986 |
| JP | S63-74629 A | 4/1988 |
| JP | 6046483 | 6/1994 |
| JP | H08-131209 A | 5/1996 |
| JP | 08239570 | 9/1996 |
| JP | 3047622 | 9/1997 |
| JP | H09-322803 A | 12/1997 |
| JP | H11129275 | 5/1999 |
| JP | 11291275 | 10/1999 |
| JP | 2000-037208 A | 2/2000 |
| JP | 2000190394 | 7/2000 |
| JP | 2000-279205 A | 10/2000 |
| JP | 2002119302 | 4/2002 |
| JP | 2002-144366 A | 5/2002 |
| JP | 2003135105 | 5/2003 |
| JP | 2003310302 | 11/2003 |
| JP | 2006137032 | 6/2006 |
| JP | 2007504977 | 3/2007 |
| JP | 2008-544009 A | 12/2008 |
| JP | 2009518495 | 5/2009 |
| JP | 2014158708 | 9/2014 |
| JP | 2014531352 | 11/2014 |
| WO | 9420568 | 9/1994 |
| WO | 99/55186 A1 | 11/1999 |
| WO | 2002/004188 A1 | 1/2002 |
| WO | 2005026243 | 3/2005 |
| WO | 2005066250 | 7/2005 |
| WO | 2007082838 | 7/2007 |
| WO | 2008087078 | 7/2008 |
| WO | 2009036240 | 3/2009 |
| WO | 2009146368 | 12/2009 |
| WO | 2010136398 | 12/2010 |
| WO | 2011125540 | 10/2011 |
| WO | 2011134996 | 11/2011 |
| WO | 2012065926 | 5/2012 |
| WO | 2014046940 | 3/2014 |
| WO | 2014150122 | 9/2014 |
| WO | 2015052265 | 4/2015 |
| WO | 2015052267 | 4/2015 |
| WO | 2015075546 | 5/2015 |
| WO | 2016/030026 A1 | 3/2016 |
| WO | 2016/030333 A1 | 3/2016 |

OTHER PUBLICATIONS

European Extended Search Report, European Patent Application No. 18200590.0, dated Jan. 19, 2019, 10 pages.

Chinese Patent Application No. 201710366900.1, Office Action, dated Dec. 24, 2018, 13 pages.

(56) References Cited

OTHER PUBLICATIONS

Japanese Patent Application No. 2017-101559, Office Action, dated Oct. 16, 2018, 8 pages.
U.S. Appl. No. 29/664,097, filed Sep. 21, 2018, Unpublished.
U.S. Appl. No. 16/353,374, filed Mar. 14, 2019, Unpublished.
U.S. Appl. No. 29/663,342, filed Sep. 13, 2018, Unpublished.
U.S. Appl. No. 29/643,233, filed Apr. 5, 2018, Unpublished.
U.S. Appl. No. 29/641,371, filed Mar. 21, 2018, Unpublished.
U.S. Appl. No. 29/663,029, filed Sep. 11, 2018, Unpublished.
U.S. Appl. No. 29/641,256, filed Mar. 20, 2018, Unpublished.
U.S. Appl. No. 29/641,223, filed Mar. 20, 2018, Unpublished.
U.S. Appl. No. 16/139,797, filed Sep. 24, 2018, Unpublished.
U.S. Appl. No. 29/614,532, filed Aug. 21, 2017, Unpublished.
U.S. Appl. No. 29/594,358, filed Feb. 17, 2017, Unpublished.
U.S. Appl. No. 29/614,545, filed Aug. 21, 2017, Unpublished.
U.S. Appl. No. 29/679,962, filed Feb. 12, 2019, Unpublished.
Unpublished U.S. Appl. No. 15/581,112, filed Apr. 28, 2017.
Unpublished U.S. Appl. No. 15/595,291, filed May 15, 2017.
Unpublished U.S. Appl. No. 29/591,016, filed Jan. 16, 2017.
Unpublished U.S. Appl. No. 29/592,935, filed Feb. 27, 2017.
Unpublished U.S. Appl. No. 29/592,946, filed Feb. 3, 2017.
Unpublished U.S. Appl. No. 29/594,228, filed Feb. 16, 2017.
Unpublished U.S. Appl. No. 29/594,358, filed Feb. 17, 2017.
Unpublished U.S. Appl. No. 29/595,852, filed Mar. 2, 2017.
Unpublished U.S. Appl. No. 29/595,857, filed Mar. 2, 2017.
Unpublished U.S. Appl. No. 29/595,859, filed Mar. 2, 2017.
Unpublished U.S. Appl. No. 62/137,139, filed Mar. 23, 2016.
German Patent Application No. DE102016209046.1, Office Action dated Jan. 10, 2017, 6 pages (No English translation available. A summary of the Office Action is provided in the Transmittal Letter submitted herewith).
EP17172479.2, "Extended European Search Report", dated Oct. 6, 2017, 10 pages.
Decision of Rejection, Japanese Patent Application No. 2017-101559, dated Jun. 4, 2019, 6 pages.
Office Action, Chinese Patent Application No. 201710366900.1, dated Jul. 16, 2019, 13 pages.
Office Action, Chinese Patent Application No. 201710366900.1, dated Dec. 16, 2019, 7 pages.
Office Action, European Patent Application No. 18200590.0, dated Dec. 9, 2019, 5 pages.
U.S. Appl. No. 29/691,166, filed May 14, 2019, Unpublished.
U.S. Appl. No. 29/691,854, filed May 20, 2019, Unpublished.
U.S. Appl. No. 16/465,485, filed May 30, 2019, Unpublished.
U.S. Appl. No. 29/693,455, filed Jun. 3, 2019, Unpublished.
U.S. Appl. No. 29/694,634, filed Jun. 12, 2019, Unpublished.
U.S. Appl. No. 29/697,489, filed Jul. 9, 2019, Unpublished.
U.S. Appl. No. 29/706,274, filed Sep. 19, 2019, Unpublished.
U.S. Appl. No. 16/680,852, filed Nov. 12, 2019, Unpublished.
U.S. Appl. No. 29/719,889, filed Jan. 8, 2020, Unpublished.
U.S. Appl. No. 29/721,029, filed Jan. 17, 2020, Unpublished.

* cited by examiner

METHOD FOR THE MANUFACTURE OF A SHOE SOLE, SHOE SOLE, AND SHOE WITH PRE-MANUFACTURED TPU ARTICLE

CROSS REFERENCE TO RELATED APPLICATION

This application is related to and claims priority benefits from German Patent Application No. DE 10 2016 209 046.1, filed on May 24, 2016 and entitled METHOD FOR THE MANUFACTURE OF A SHOE SOLE, SHOE SOLE, SHOE AND PRE-MANUFACTURED TPU ARTICLE, the content of which is hereby incorporated herein in its entirety by this reference.

FIELD OF THE INVENTION

The present invention relates to a method for the manufacture of a shoe sole, a corresponding manufactured sole, and a shoe comprising such sole. The invention further relates to a pre-manufactured article comprising thermoplastic polyurethane (TPU), in particular an outsole.

BACKGROUND

The conventional manufacture of shoe soles, in particular of sport shoes, generally involves processing various plastic components. Recently, it has become known to produce shoe soles or parts thereof such as midsoles from particles of expanded thermoplastic polyurethane (eTPU). Such particle midsoles can be bonded to standard outsoles made of rubber or any other material using adhesives. However, the use of adhesives is disadvantageous for the environment and can be harmful for workers due to solvents or other substances contained in such adhesives. Moreover, it also involves a considerable amount of manual labor.

One option to avoid or at least reduce the use of adhesives is to provide shoe soles from plastic components, which can be molded together by applying steam or other energy transferring media. Such techniques are for example disclosed in EP 2 649 896 A2, WO 2005/066250 A1, WO 2012/065926 A1, DE 10 2011 108 744 A1, and EP 2 984 956 A1. Further prior art in this regard is disclosed in EP 2 767 181 A1, WO 2007/082838 A1, WO 2008/087078 A1.

However, at present it is extremely difficult, if not almost impossible, to bond a midsole made from expanded TPU particles to a rubber outsole without involving adhesives. Therefore, one approach is to use a different outsole material that is more compatible with the material of the expanded TPU particles of the midsole, such as (non-expanded) TPU. When trying to connect a TPU outsole during molding with the expanded TPU particles, the TPU of the outsole may, however, start to melt, deform and/or bleed, which leads to unsatisfactory products.

It is therefore a problem underlying the present invention to overcome the above disadvantages when manufacturing a shoe sole.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some embodiments, a method for the manufacture of a shoe sole comprises loading a pre-manufactured article comprising TPU material into a mold, loading particles of an eTPU material into said mold, and connecting the particles with each other and to the pre-manufactured TPU article by providing an interconnecting medium, wherein the material of the pre-manufactured TPU article is a material selected from a material comprising an additive to increase the viscosity, or a material which has been annealed.

According to various embodiments, a method for the manufacture of a shoe sole comprises loading a pre-manufactured article comprising TPU material into a mold, loading particles of an eTPU material into said mold, and connecting the particles with each other and to the pre-manufactured TPU article by providing an interconnecting medium, wherein the material of the pre-manufactured TPU article comprises an additive to increase the viscosity of the material of the pre-manufactured TPU article.

According to certain embodiments, a method for the manufacture of a shoe sole comprises loading a pre-manufactured article comprising TPU material into a mold, loading particles of an eTPU material into said mold, and connecting the particles with each other and to the pre-manufactured TPU article by providing an interconnecting medium, wherein the material of the pre-manufactured TPU article has been subjected to at least one annealing step in order to increase the melting onset temperature of the material of the pre-manufactured TPU article.

In various embodiments, the pre-manufactured article can be an outsole and/or other articles such as reinforcing TPU components for the midsole are possible.

In some embodiments, the additive can be provided during injection molding of the pre-manufactured TPU article.

In certain embodiments, the pre-manufactured TPU article can comprise the additive in an amount of 1 to 15% by weight based on 100% by weight of the TPU material of the pre-manufactured TPU article.

According to certain embodiments, the annealing step is carried out to increase the melting onset temperature to such an extent that an undesirable deformation of the pre-manufactured TPU article is avoided, when the particles and the pre-manufactured article are connected in step c. In some embodiments, the melting onset temperature is increased by about 5 to about 50° C.

In some embodiments, the annealing step is carried out at a temperature in the range of from about 100 to about 150° C. In various embodiments, the annealing step is carried out for a time period of from about 2 to about 20 hours.

According to various embodiments, the interconnecting medium comprises one or more of the following: pressurized steam, an electromagnetic radiation, and/or a gaseous bonding agent. In certain embodiments, during step c. the particles of the expanded TPU material are heated by the interconnecting medium to a temperature between the melting onset temperature and the peak melting point of the expanded TPU material. In some embodiments, during step c. the particles of the expanded TPU are heated up to a range of from about 100° C. to about 5° C. below the melting point of the expanded TPU material.

In various embodiments, the additive may comprise an isocyanate group.

According to some embodiments, a sole is obtained or produced by any of the methods described above. According to further embodiments, a shoe is obtained or produced, in particular a sports shoe, with a sole as described above. In some embodiments, a pre-manufactured article comprises TPU material and an additive increasing the viscosity of the TPU material. In various embodiments, a pre-manufactured article comprises TPU material, wherein the TPU material has been subjected to at least one annealing step at a temperature in the range of from 100 to 150° C. and for a time period of from 2 to 20 hours.

BRIEF DESCRIPTION OF THE DRAWINGS

Possible embodiments of the present invention are further described in the following detailed description, with reference to the following figures.

BRIEF DESCRIPTION

The above problem is at least partly solved by the subject matter of the independent claims of the present invention.

In one embodiment, the invention provides a method for the manufacture of a shoe sole, comprising the following steps:
  a. loading a pre-manufactured article comprising thermoplastic polyurethane (TPU) material into a mold;
  b. loading particles of an expanded thermoplastic polyurethane (eTPU) material into said mold; and
  c. connecting the particles with each other and to the pre-manufactured TPU article by providing an interconnecting medium,
  d. wherein the material of the pre-manufactured TPU article is a material selected from a material comprising an additive to increase the viscosity, or a material that has been annealed.

In another embodiment, the invention provides a method for the manufacture of a shoe sole, comprising the following steps:
  a. loading a pre-manufactured article comprising thermoplastic polyurethane (TPU) material into a mold;
  b. loading particles of an expanded thermoplastic polyurethane (eTPU) material into said mold; and
  c. connecting the particles with each other and to the pre-manufactured TPU article by providing an interconnecting medium;
  d. wherein the material of the pre-manufactured TPU article comprises an additive to increase the viscosity of the material of the pre-manufactured TPU article.

In a further embodiment, the invention provides a method for the manufacture of a shoe sole, comprising the following steps:
  a. loading a pre-manufactured article comprising thermoplastic polyurethane (TPU) material into a mold;
  b. loading particles of an expanded thermoplastic polyurethane (eTPU) material into said mold; and
  c. connecting the particles with each other and to the pre-manufactured TPU article by providing an interconnecting medium,
  d. wherein the material of the pre-manufactured TPU article has been subjected to at least one annealing step in order to increase the melting onset temperature of the material of the pre-manufactured TPU article.

The inventors of the present invention have surprisingly found that an outsole material that comprises, in addition to TPU, an additive, which increases the viscosity, may lead to an increase of the viscosity of the TPU material of the article. The inventors of the present invention have surprisingly further found that an outsole material that has been subjected to an annealing step may lead to an increase of the melting onset temperature. As a result, there is less or even no melting/deforming/bleeding during or after molding the TPU article to a midsole made from expanded TPU (eTPU) particles.

It will be apparent to the skilled person that whilst the terms melting/deforming/bleeding are distinct terms they are being interchangeably used in the context of this application to describe an effect that could be attributable, wholly or in part, to each of the mechanisms.

The pre-manufactured article can be an outsole but also other articles such as reinforcing TPU components for the midsole are possible.

The additive can be provided during injection molding of the pre-manufactured TPU article.

The pre-manufactured TPU article can comprise the additive in an amount of 1 to 15% by weight, in particular 1 to 10% by weight, preferably 1 to 5% by weight, more preferably 2 to 3% by weight, based on 100% by weight of the TPU material of the pre-manufactured TPU article.

The additive can increase the viscosity to such an extent that a deformation of the pre-manufactured TPU article is avoided, when the particles and the pre-manufactured article are connected in step c. In particular, when the particles and the pre-manufactured article are connected in step c, a processing temperature is provided by the interconnecting medium. If the melting onset temperature of the pre-manufactured TPU article is low enough, relative to the provided processing temperature, then undesirable deformation of the pre-manufactured TPU article will occur. Thus, when the processing temperature is sufficient to cause melting of the pre manufactured TPU article the additive increases the viscosity to such an extent that undesirable deformation of the pre-manufactured TPU article is avoided, when the particles and the pre-manufactured article are connected in step c.

In a preferred embodiment, the annealing step has been carried out to increase the melting onset temperature to such an extent that an undesirable deformation of the pre-manufactured TPU article is avoided, when the particles and the pre-manufactured article are connected in step c. Preferably, the melting onset temperature is increased by 5 to 50° C., in particular 10 to 30° C., or by 5 to 20° C.

In an exemplary embodiment, the annealing step has been carried out at a temperature in the range of from 100 to 150° C., in particular from 120 to 140° C. In another exemplary embodiment, the annealing step has carried out for a time period of from 2 to 20 hours, in particular from 5 to 17 hours.

It is possible that the interconnecting medium comprises one or more of the following: pressurized steam, an electromagnetic radiation, and a gaseous bonding agent. In exemplary embodiments, during step c. the particles of the expanded TPU material are heated by the interconnecting medium to a temperature between the melting onset temperature and the peak melting point of the expanded TPU material. For example, during step c. the particles of the expanded TPU are heated up to a range of from 100° C. to 5° C. below the melting point of the expanded TPU material, in particular from 80° C. to 5° C. below the melting point of the expanded TPU material, preferably from 60° C. to 5° C. below the melting point of the expanded TPU material, more preferably from 40° C. to 5° C. below the melting point of the expanded TPU material.

The additive may comprise an isocyanate group.

A further aspect of the invention concerns a sole obtainable or produced by any of the methods described above. Another aspect of the invention concerns a shoe, in particular a sports shoe, with a sole as described above. Finally, the invention concerns a pre-manufactured article, for example, an outsole, comprising TPU material and an additive increasing the viscosity of the TPU material. Furthermore, the invention concerns a pre-manufactured article, for example, an outsole, comprising TPU material, wherein the TPU material has been subjected to at least one annealing step at a temperature in the range of from 100 to 150° C. and for a time period of from 2 to 20 hours.

The invention is further described in the following description, the embodiments, examples, the figures, and the claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following detailed description, preferred examples and embodiments of the invention are described. However, this is not to be construed as limiting the scope of the present invention, which is defined in the attached claims. Moreover, while various aspects of the examples and embodiments are described below, it is apparent for the skilled person that other combinations thereof, even if not explicitly mentioned, are also to be encompassed.

The polymer used for the production of both, of the pre-manufactured article and the expanded polymer particles, comprises a TPU. Generally, polyurethanes are produced by reaction of multifunctional isocyanates with polyols. TPUs are specific polyurethanes, which are thermoplastic and contain linear segmented block copolymers including hard and soft segments. TPU can contain the reaction products of a polyester polyol or polyether polyol with an isocyanate component. TPUs are well known in the art and commercially available on the market. TPU can be, for example, injection-molded to produce manufactured articles. TPUs are also known and available on the market in form of expanded or foamed TPU particles, which can be further processed by, for example, molded to produce manufactured articles.

The pre-manufactured article used in the methods of the invention can be produced from any TPU material by any method known in the art. Preferably, the article is produced by melting TPU, for example, melting TPU, within the plasticizing unit of an injection molding machine, and then injecting the material into a mold to form the pre-manufactured article. However, other molding techniques are possible.

The particles of expanded TPU (eTPU) used in the methods of the invention can be produced from any TPU material by any method known in the art for producing expanded polymer particles.

According to one embodiment of the invention, an additive increasing the viscosity is added to the material of the TPU article. This may be done before or during melting of the TPU. Other additives may be added as well to the TPU, either before or during melting. The additive increasing the viscosity can be mixed with the TPU before injection molding, for example, by a dry blended masterbatch. Even the additive manufacture of the TPU article is also conceivable.

The additive increasing the viscosity can be a TPU, which contains in an embodiment isocyanate groups. The additive increasing the viscosity can be a crosslinking additive, one such example being X-Flex® V2909. Further examples for a suitable additive are Elastollan X-Flex®, X-Flex® V2905, all being obtainable from BASF. In further embodiments, the additive comprises an organosilicon compound or group.

The additive can be used in amounts of, for example, 1 to 15% by weight, 1 to 10% by weight, or 1 to 5% by weight, based on 100% by weight of the TPU material. In exemplary embodiments, the additive is used in amounts from 1 to 4% by weight, in particular 2 to 3% by weight, for example, 1% by weight, 2% by weight, 3% by weight, 4% by weight or 5% by weight, based on 100% by weight of the TPU material.

In another embodiment, the TPU material of the pre-manufactured article has been annealed. The annealing can be carried out in at least one annealing step, for example, one or two annealing steps. It is also possible, and in some cases advantages, to perform a multi-stage annealing process, wherein multiple annealing steps are performed and the temperature is increased with each annealing step. The annealing step(s) increase the melting onset temperature, in particular to such an extent that a deformation of the pre-manufactured TPU article is avoided, when the particles of the expanded TPU material and the pre-manufactured article are connected in step c.

The annealing can be carried out by techniques known in the art. For example, the pre-manufactured article can be annealed in a circulation oven, which permits adjusting of the desired temperatures and time periods. Preferably, the annealing increases the melting onset temperature to such an extent that undesirable deformation of the pre-manufactured TPU article is avoided or that there is essentially no deformation of the pre-manufactured TPU article. The annealing step can be carried out at a temperature in the range of from 100 to 150° C., in particular from 110 to 140° C., preferably from 120 to 140° C., more preferably from 120 to 130° C., or from 130 to 140° C. The annealing step can be carried out for a time period of from 2 to 20 hours, in particular from 3 to 19 hours, preferably from 5 to 17 hours, more preferably from 10 to 17 hours, most preferably from 15 to 17 hours.

As mentioned above, the present invention is particularly applicable for the manufacture of shoe soles and further outsoles or outsole elements, which are to be connected to a midsole made from particles of expanded eTPU. Such a shoe sole with an outsole element is exemplary shown in FIG. 1, which is explained in more detail below. The outsole element shown in FIG. 1 with reference numeral 30 is an outsole comprising an additive to increase the viscosity. Such an outsole element 30 is further described in an exemplary embodiment in FIG. 3. The outsole element shown in FIG. 1 with reference numeral 50 is an outsole, which has been annealed according to one embodiment of the invention. Such an outsole element 50 is further described in an exemplary embodiment in FIG. 5.

Figure 1:
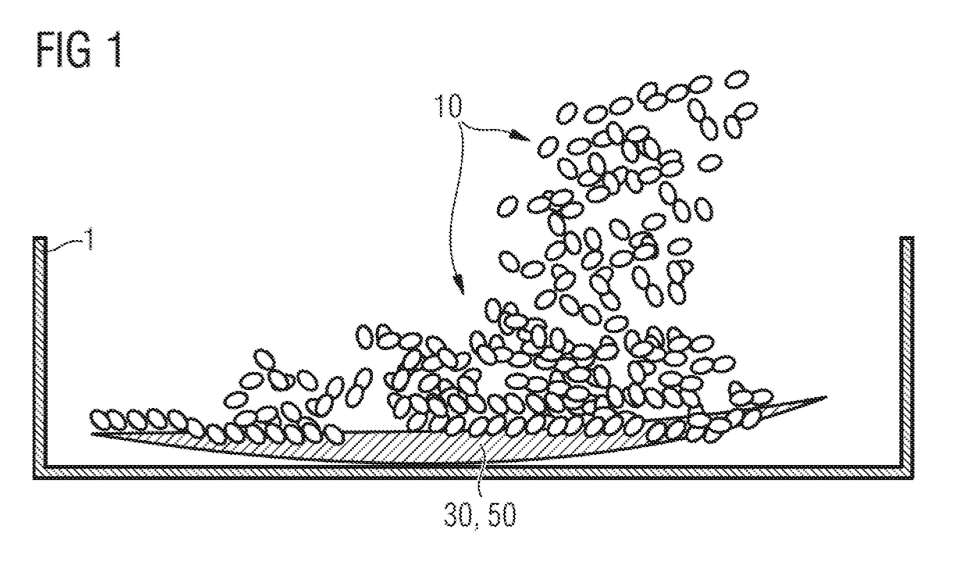
FIG. 1 is a schematic of a shoe sole with a pre-manufactured article according to aspects of the present disclosure.

As schematically presented in FIG. 1, when molding the pre-manufactured article, for example, an outsole element 30 or 50, to the expanded TPU particles 10 the outsole element 30 or 50 is loaded into a mold 1. This is followed by loading of the particles 10 into the mold 1. Upon application of an energy transferring medium such as steam (not shown in FIG. 1), the particles 10 can be connected with and to each other and to the outsole element 30 or 50 in a single process step. Due to the additive added to the TPU material or due to the annealing step(s), the outsole element 30 and 50, is not adversely affected by the elevated temperatures and/or the pressure within the mold 1 during molding. In particular, fine structures, as they are typically provided on an outsole element, do not deform or start to melt during the molding process. As a result, a complete shoe sole comprising a midsole from molded particles of expanded eTPU and a high-quality outsole can be obtained.

Figure 2:
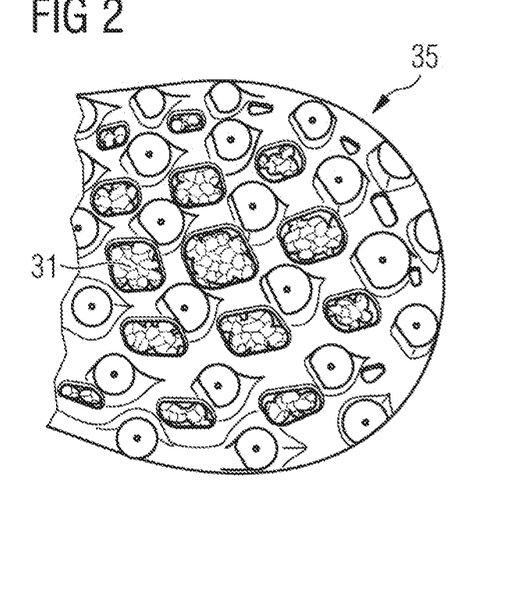
FIG. 2 illustrates an underside of a shoe sole according to aspects of the present disclosure where an outsole has been molded to a midsole made from expanded TPU particles and the outsole comprises TPU without an additive to increase the viscosity.
Figure 3:
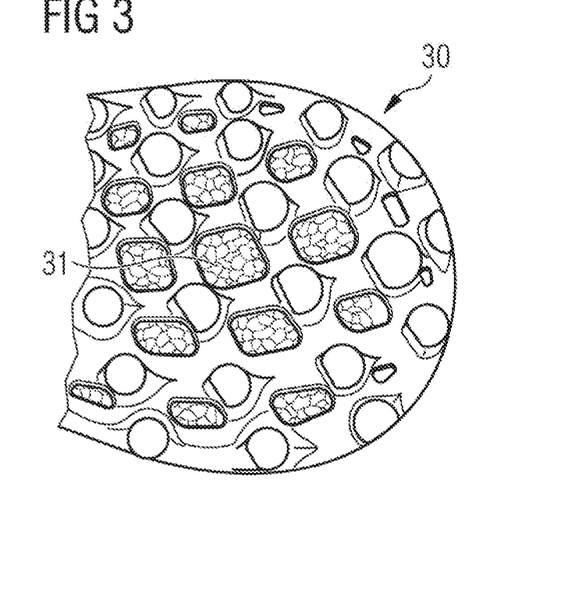
FIG. 3 illustrates an underside of a shoe sole according to aspects of the present disclosure where an outsole has been molded to a midsole made from expanded TPU particles and the outsole comprises TPU and an additive to increase the viscosity.

The advantages of the embodiment of the present invention using the additive are illustrated by a comparison of FIGS. 2 and 3 and further described in Examples 1 and 2. FIG. 2 shows a bottom view of a shoe sole with a grid-like outsole 35 having a plurality of openings 31. The outsole has been processed as explained above with reference to FIG. 1, wherein the TPU material of the outsole 35 does not contain the additive of the present invention. As can be seen, the borders of the openings 31 are ill-defined, as the material from the outsole 35 has started to "bleed" forming a plurality of little protrusions into the openings 31.

FIG. 3 shows an embodiment, wherein the additive has been added to the TPU material of the outsole 30. As can be seen, there is no bleeding and the borders of each opening 31 are well defined. This illustrates the significant contribution of the present invention to the manufacture of high-quality shoe soles.

Figure 4:
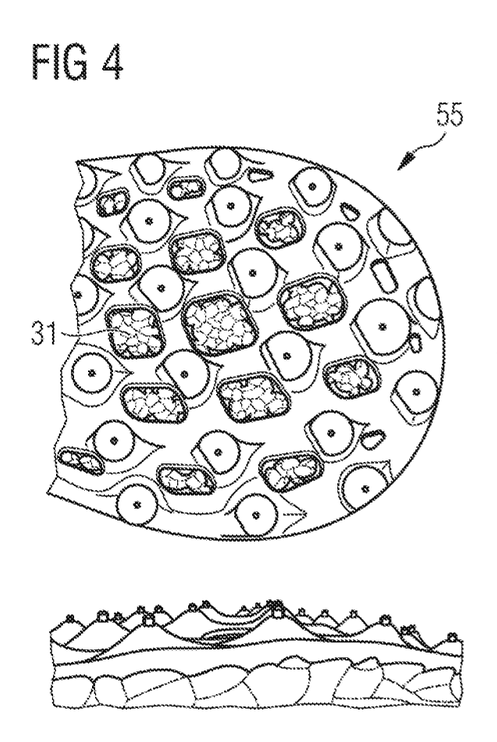
FIG. 4 illustrates a shoe sole according to aspects of the present disclosure where an outsole has been molded to a midsole made from expanded TPU particles and the outsole comprises TPU and has not been annealed.
Figure 5:
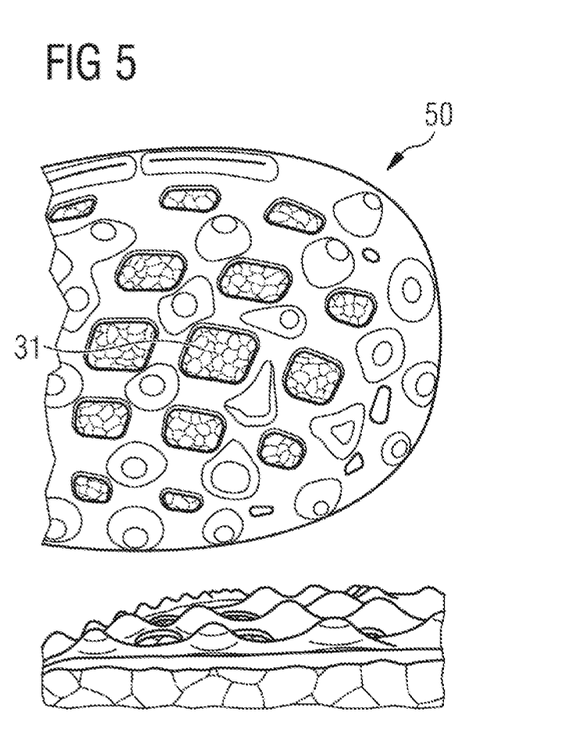
FIG. 5 illustrates a shoe sold according to aspects of the present disclosure where an outsole has been molded to a midsole made from expanded TPU particles and the outsole comprises TPU and has been annealed.

The advantages of the other embodiment of the present invention using the annealing step are illustrated by a comparison of FIGS. 4 and 5. FIG. 4 shows an outsole element 55 which has not been annealed. FIG. 5 shows an outsole element 50 which has been annealed at 130° C. for 17 hours. The advantages shown are the same as described above for a comparison of FIGS. 2 and 3. FIGS. 4 and 5 are further described in Example 3.

The invention is further illustrated by means of the following examples that show embodiments but do not limit the invention.

EXAMPLES

Example 1

As base polymer, a TPU material was used. The TPU used was Elastollan 1160A 10P obtainable from BASF. As an additive, X-Flex V2909 was used which is also obtainable from BASF. The additive was used in amounts of 0, 2, 3, 4 and 5% by weight.

The base polymer and the additive were dry blended and then fed to an injection molding machine to produce the outsole. The outsole was laid into a mold, as shown in FIG. 1, then expanded TPU particles were filled into mold onto the outsole. After having completed the filling step, the mold was closed and steam molding was carried out. Finally, the mold was opened and the finished shoe sole released.

Example 2

As base polymer, a TPU material was used. The TPU used was Elastollan SP 9324, obtainable from BASF. As an additive, X-Flex V2909 and X-Flex V2881-1 were used, both of which are also obtainable from BASF. The additive was used in amounts of 0%, 1% X-Flex V2881-1, 5% X-Flex V2909.

The base polymer and the additive were dry blended and then fed to an injection molding machine to produce the outsole. The outsole was laid into a mold, as shown in FIG. 1, then expanded TPU particles were filled into mold onto the outsole. After having completed the filling step, the mold was closed and steam molding was carried out. Finally, the mold was opened and the finished shoe sole released. FIG. 3 shows an underside and a cross-section of the shoe sole. In comparison, FIG. 2 shows a shoe sole with an outsole, which does not contain an additive.

Example 3

As base polymer, a TPU material was used. The TPU used was Elastollan 1160A 10P obtainable from BASF. The base polymer was fed to an injection molding apparatus to produce the outsole. The outsole was annealed in a circulation oven at 130° C. for 17 hours.

The annealed outsole was laid into a mold, as shown in FIG. 1, then expanded TPU particles were filled into mold onto the outsole. After having completed the filling step, the mold was closed and steam molding was carried out. Finally, the mold was opened and the finished shoe sole released. FIG. 5 shows an underside and a cross-section of the shoe sole. In comparison, FIG. 4 shows a shoe sole with an outsole, which has not been annealed.

In the following, further embodiments are described to facilitate the understanding of the invention:
1. Method for the manufacture of a shoe sole, comprising
   a. loading a pre-manufactured article comprising thermoplastic polyurethane (TPU) material into a mold;
   b. loading particles of an expanded thermoplastic polyurethane (eTPU) material into said mold; and
   c. connecting the particles with each other and to the pre-manufactured TPU article by providing an interconnecting medium, d. wherein the material of the pre-manufactured TPU article is a material selected from a material comprising an additive to increase the viscosity, or a material, which has been annealed.

2. Method according to embodiment 1, comprising
a. loading a pre-manufactured article comprising thermoplastic polyurethane (TPU) material into a mold;
b. loading particles of an expanded thermoplastic polyurethane (eTPU) material into said mold; and
c. connecting the particles with each other and to the pre-manufactured TPU article by providing an interconnecting medium,
d. wherein the material of the pre-manufactured TPU article comprises an additive to increase the viscosity of the material of the pre-manufactured TPU article.

3. Method according to embodiment 1, comprising
a. loading a pre-manufactured article comprising thermoplastic polyurethane (TPU) material into a mold;
b. loading particles of an expanded thermoplastic polyurethane (eTPU) material into said mold; and
c. connecting the particles with each other and to the pre-manufactured TPU article by providing an interconnecting medium,
d. wherein the material of the pre-manufactured TPU article has been subjected to at least one annealing step in order to increase the melting onset temperature of the material of the pre-manufactured TPU article.

4. Method according to embodiment 1 or 2, wherein the additive has been provided during an injection molding of the pre-manufactured TPU article.

5. Method according to any one of embodiments 1, 2 or 4, wherein the pre-manufactured TPU article comprises the additive in an amount of 1 to 15% by weight, in particular 1 to 10% by weight, preferably 1 to 5% by weight, more preferably 2 to 3% by weight, based on 100% by weight of the TPU material of the pre-manufactured TPU article.

6. Method according to any one of embodiments 1, 2, 4 or 5, wherein the additive increases the viscosity to such an extent that undesirable deformation of the pre-manufactured TPU article is avoided, when the particles and the pre-manufactured article are connected in step c.

7. Method according to embodiment 1 or 3, wherein the annealing step has been carried out to increase the melting onset temperature to such an extent that undesirable deformation of the pre-manufactured TPU article is avoided, when the particles and the pre-manufactured article are connected in step c.

8. Method according to any one of embodiments 1, 3 and 7, wherein the annealing step has been carried out at a temperature in the range of from 100 to 150° C., in particular from 120 to 140° C.

9. Method according to any one of embodiments 1, 3, 7 and 8, wherein the annealing step has been carried out for a time period of from 2 to 20 hours, in particular from 5 to 17 hours.

10. Method according to embodiment 9, wherein the melting onset temperature is increased by 5 to 50° C., in particular by 10 to 30° C., or by 5 to 20° C.

11. Method according to any one of the preceding embodiments, wherein the interconnecting medium comprises one or more of the following: pressurized steam, an electromagnetic radiation, a gaseous bonding agent.

12. Method according to any one of the preceding embodiments, wherein during step c. the particles of the expanded TPU material are heated to a temperature between a glass transition temperature and below the peak melting temperature of the expanded TPU material.

13. Method according to embodiment 12, wherein during step c. the particles of the expanded TPU are heated up to a range of from 100° C. to 5° C. below the peak melting point of the expanded TPU material, in particular from 80° C. to 5° C. below the peak melting point of the expanded TPU material, preferably from 60° C. to 5° C. below the peak melting point of the expanded TPU material, more preferably from 40° C. to 5° C. below the peak melting point of the expanded TPU material.

14. Method according to any one of embodiments 1, 2, 4 to 6 and 11 to 13, wherein the additive comprises an isocyanate group.

15. Method according to any one of embodiments 1, 2, 4 to 6 and 11 to 14, wherein the additive comprises an organosilicon compound.

16. Method according to any one of the preceding embodiments, wherein the pre-manufactured TPU article is an outsole.

17. Shoe sole obtainable by a method according to any one of embodiments 1 to 16.

18. Shoe comprising the shoe sole according to embodiment 17.

19. Pre-manufactured article comprising TPU material and an additive to increase the viscosity of the material of the pre-manufactured TPU article in an amount of 1 to 15% by weight, in particular 1 to 10% by weight, preferably 1 to 5% by weight, more preferably 2 to 3% by weight, based on 100% by weight of the TPU material of the pre-manufactured article.

20. Pre-manufactured article comprising TPU material, wherein the material of the pre-manufactured TPU article has been subjected to at least one annealing step at a temperature in the range of from 100 to 150° C. and for a time period of from 2 to 20 hours.

21. Pre-manufactured article according to embodiment 19 or 20, wherein the article is an outsole.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A shoe sole comprising:
(a) an outsole, wherein the outsole material consists of thermoplastic polyurethane (TPU) material and from 1 to 15% by weight based on 100% by weight of the TPU material, of a single additive; and
(b) a midsole in contact with an upper surface of the outsole, the midsole consisting of particles of an expanded thermoplastic polyurethane (eTPU).

2. A shoe comprising the shoe sole of claim 1.

3. The shoe sole according to claim 1, wherein the additive is an organosilicon.

4. The shoe sole according to claim 1, wherein the additive is a compound having an organosilicon group.

5. The shoe sole according to claim 1, wherein the additive is present from 1 to 10% by weight based on 100% by weight of the TPU material.

6. The shoe sole according to claim 1, wherein the additive is present from 1 to 5% by weight based on 100% by weight of the TPU material.

7. The shoe sole according to claim 1, wherein the additive is present from 1 to 4% by weight based on 100% by weight of the TPU material.

8. The shoe sole according to claim 1, wherein the additive is present from 2 to 3% by weight based on 100% by weight of the TPU material.

9. The shoe sole according to claim 1, wherein the outsole has a plurality of openings.

10. The shoe sole according to claim 1, wherein the outsole and the midsole are bonded together.

11. The shoe according to claim 2, wherein the outsole has a plurality of openings.

12. The shoe according to claim 2, wherein the outsole and the midsole are bonded together.

13. The shoe according to claim 2, wherein the additive is an organosilicon.

14. The shoe according to claim 2, wherein the additive is a compound having an organosilicon group.

15. The shoe according to claim 2, wherein the additive is present from 1 to 10% by weight based on 100% by weight of the TPU material.

16. The shoe according to claim 2, wherein the additive is present from 1 to 10% by weight based on 100% by weight of the TPU material.

* * * * *